UNITED STATES PATENT OFFICE.

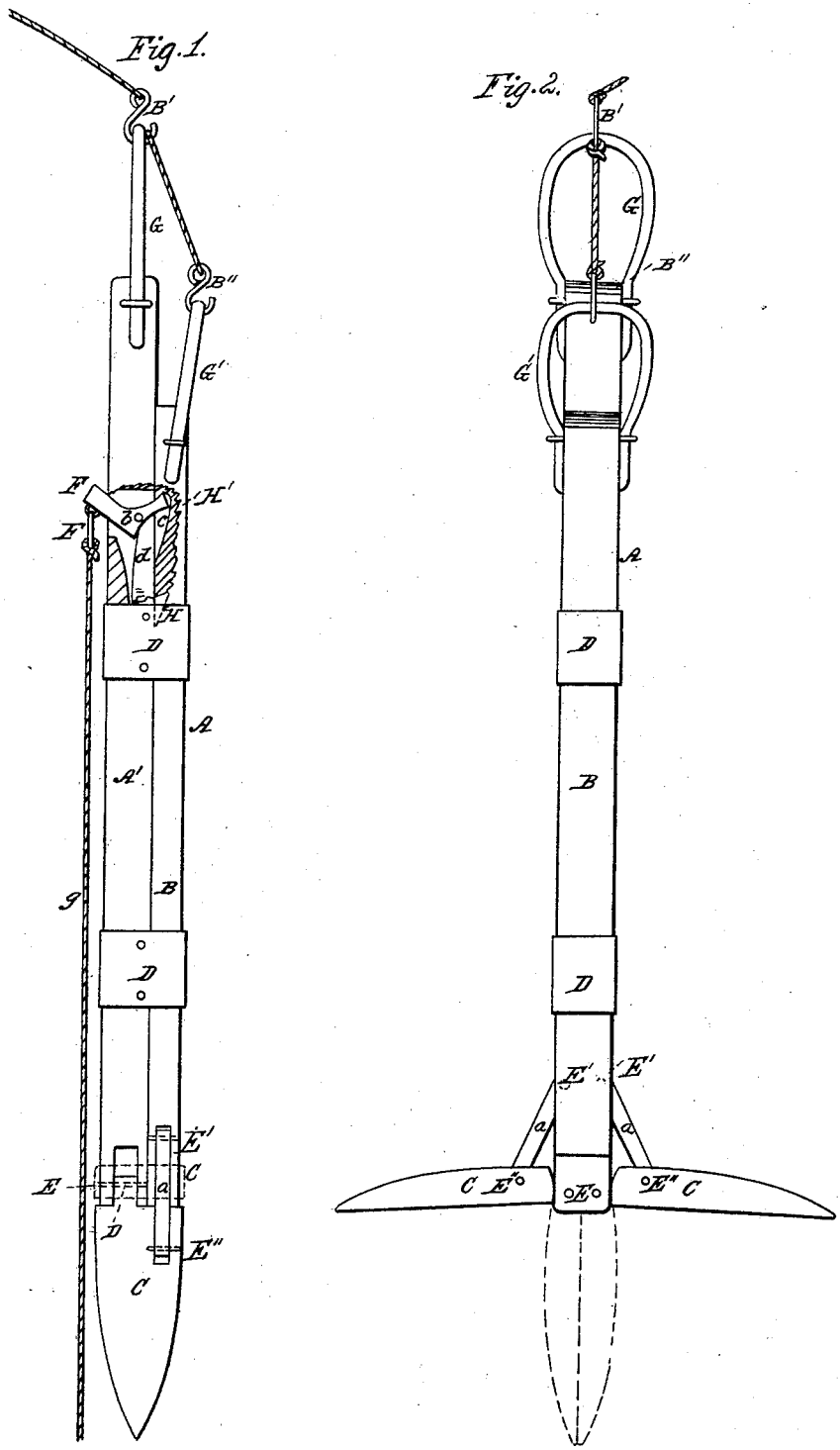

A. J. COOLEY, OF CHARDON, OHIO.

IMPROVEMENT IN HORSE HAY-FORKS.

Specification forming part of Letters Patent No. 56,375, dated July 17, 1866.

*To all whom it may concern:*

Be it known that I, A. J. COOLEY, of Chardon, in the county of Geauga and State of Ohio, have invented certain new and useful Improvements in Hay-Forks; and I do hereby declare that the following is a full and complete description of the same, reference being had to the accompanying drawings, making a part of this specification, in which—

Figures 1 and 2 are views of the fork, which will be referred to in the following description.

Like letters of reference refer to like parts in the different views.

The shaft A of the fork consists of two shanks, A' and B, which are connected together by the bands D. These bands are bolted to the shank A', and permit the shank B to slide up and down.

C C are arms of the fork. These arms are pivoted or hinged to both shanks—at E to the shank A' and at E' to the shank B—by the two links $a\ a$. These links are pivoted to the arms C at E.

F is a catch, which is pivoted at $b$ to the shank A'. A notch, $c$, is cut in the shank B, into which the catch fits. It is kept in this notch by the action of the spring $d$, which is screwed to the shank A' at $e$. This catch is operated by a rope, $g$, attached at $f$. G G' are loops by which the fork is suspended.

The fork, in the position shown in Fig. 1, is thrust into the hay. When in as far as desired the shank B is drawn up by hand; or there may be two hooks, B' and B'', attached to the rope, by which the load is to be raised. When the arms are closed the hook B'' may be hooked into the loop G' and the shank B raised until the arms are open, when the catch $f$ springs into the notch $c$. The distance between the hooks is such that when the arms are extended the hook B' is in the position to hook into the loop G, by which the load is raised. The catch F moves into the notch by means of the spring, which holds the arms firmly extended, these arms sustaining the hay. It is then drawn up by means of pulleys and carried to any desirable place. The catch F is then pulled out of the notch $c$ by the rope $g$. The weight of the hay pulls the shank B down and closes the arms, thus depositing the hay. When the arms are closed the notch $c$ is down in the position shown by the dotted lines at H, Fig. 1. When they are extended, as shown at H' in Fig. 1, the notch $c$ is raised so that the catch springs into it, thus holding the arms extended.

There being no projections at the lower ends of the shanks, and the under side of the arms being flat, the fork can be thrust to the bottom of the load. Thus the hay can be cleanly gathered from the rack.

What I claim as my improvement, and desire to secure by Letters Patent, is—

1. The arrangement of the arms C, shanks A A', and links $a$ with the catch F, spring $d$, and notch $c$, as and for the purpose substantially as set forth.

2. The hooks B' B'', with the connecting ropes or chains, in combination with the loops G G', shanks A A', and bands D, substantially as and for the purpose set forth.

A. J. COOLEY.

Witnesses:
 W. H. BURRIDGE,
 E. E. WAITE.